US009148869B2

(12) United States Patent
Van Heerden et al.

(10) Patent No.: US 9,148,869 B2
(45) Date of Patent: Sep. 29, 2015

(54) LOCATION-BASED ACCOUNT ACTIVITY ALERTS (71) Applicant: THE TORONTO DOMINION BANK, Mississauga (CA)

(72) Inventors: Lauren Van Heerden, Bedford, NH (US); Michael D. Cummins, Pickering (CA); Prabaharan Sivashanmugam, Farmington Hills, MI (US); Gunalan Nadarajah, Richmond Hill (CA); Orin Del Vecchio, Richmond Hill (CA)

(73) Assignee: THE TORONTO-DOMINION BANK, Mississauga (CA)

( * ) Notice: Subject to any disclaimer, the term of this patent is extended or adjusted under 35 U.S.C. 154(b) by 0 days.

(21) Appl. No.: 14/508,575

(22) Filed: Oct. 7, 2014

(65) Prior Publication Data
US 2015/0105105 A1 Apr. 16, 2015

Related U.S. Application Data (60) Provisional application No. 61/891,009, filed on Oct. 15, 2013.

(51) Int. Cl.
*H04W 8/18* (2009.01)
*H04W 4/02* (2009.01)
(Continued)

(52) U.S. Cl.
CPC .............. *H04W 64/006* (2013.01); *H04W 8/18* (2013.01); *H04W 68/04* (2013.01)

(58) Field of Classification Search
CPC ... H04W 68/00; H04W 68/005; H04W 68/06; H04W 4/02; H04W 4/021; H04W 4/023; H04W 4/025; H04W 8/18; H04W 64/00; H04L 12/587; H04M 3/537
See application file for complete search history.

(56) References Cited

U.S. PATENT DOCUMENTS 5,592,664 A 1/1997 Starkey
6,279,826 B1 8/2001 Gill et al.
(Continued)

FOREIGN PATENT DOCUMENTS

WO WO2010080156 7/2010
WO WO2013095287 6/2013

OTHER PUBLICATIONS

Buchmann, "Dream: Distributed Reliable Event-based Application Management." Department of Computer Science, Darmstadt University of Technology, Germany. 34 Pages.
(Continued)

*Primary Examiner* — Marisol Figueroa
(74) *Attorney, Agent, or Firm* — Knobbe Martens Olson & Bear LLP (57) ABSTRACT A method of controlling issuance of alerts involves a server receiving notification of occurrence of an event at an account, saving in an events history the event occurrence, receiving device information from a mobile device associated with the account, and determining a position and/or speed from the device information. The server maintains at least one event definition defining particulars of suspension of notifications of events at an account. Upon the position or speed correlating with one of the event definitions, the server saves in the events history an occurrence of at least one additional event occurring at the account subsequent to the event, and suspends notification of the saved occurrences to the mobile device. The server transmits to the mobile device a notification of the occurrences saved in the events history and clears the events history upon the position and speed no longer correlating with any of the event definitions.

6 Claims, 4 Drawing Sheets (51) Int. Cl.
*H04W 64/00* (2009.01)
*H04W 68/04* (2009.01)

(56) References Cited

U.S. PATENT DOCUMENTS

| | | |
|---|---|---|
| 6,741,926 B1 | 5/2004 | Zhao et al. |
| 6,973,384 B2 | 12/2005 | Zhao et al. |
| 7,215,942 B1 | 5/2007 | McQuaide et al. |
| 7,218,938 B1 | 5/2007 | Lau et al. |
| 7,598,850 B2 | 10/2009 | Manz |
| 7,621,443 B2 | 11/2009 | Keohane et al. |
| 7,685,036 B1 | 3/2010 | Hsu et al. |
| 7,697,922 B2 | 4/2010 | McQuaide et al. |
| 7,779,119 B2 | 8/2010 | Ginter et al. |
| 8,073,461 B2 | 12/2011 | Altman et al. |
| 8,078,538 B1 | 12/2011 | Buch et al. |
| 8,112,100 B2 | 2/2012 | Frank et al. |
| 8,200,249 B2 | 6/2012 | Lipovski |
| 8,233,919 B2 | 7/2012 | Haag et al. |
| 8,266,205 B2 | 9/2012 | Hammad et al. |
| 8,295,851 B2 | 10/2012 | Finnegan et al. |
| 8,396,455 B2 | 3/2013 | Carlson et al. |
| 8,401,906 B2 | 3/2013 | Ruckart |
| 8,463,297 B2 | 6/2013 | Bull et al. |
| 2006/0182055 A1 | 8/2006 | Coffee et al. |
| 2007/0149214 A1 | 6/2007 | Walsh et al. |
| 2007/0281716 A1 | 12/2007 | Altman et al. |
| 2008/0032703 A1 | 2/2008 | Krumm et al. |
| 2008/0270303 A1 | 10/2008 | Zhou et al. |
| 2009/0170530 A1 | 7/2009 | Kadavallur et al. |
| 2010/0102122 A1 | 4/2010 | Skowronek |
| 2010/0217615 A1* | 8/2010 | Brown et al. ............... 705/1.1 |
| 2010/0241535 A1 | 9/2010 | Nightengale et al. |
| 2011/0045847 A1* | 2/2011 | Roin et al. ............... 455/456.3 |
| 2011/0055076 A1 | 3/2011 | Trifiletti et al. |
| 2011/0248863 A1 | 10/2011 | Johnson et al. |
| 2011/0252141 A1* | 10/2011 | Boberg et al. ............... 709/226 |
| 2012/0094639 A1 | 4/2012 | Carlson et al. |
| 2012/0117507 A1 | 5/2012 | Tseng et al. |
| 2012/0197793 A1 | 8/2012 | Grigg et al. |
| 2012/0209773 A1 | 8/2012 | Ranganathan et al. |
| 2013/0018779 A1 | 1/2013 | Laquerre et al. |
| 2013/0024373 A1 | 1/2013 | Choudhuri et al. |
| 2013/0036000 A1 | 2/2013 | Giordano et al. |
| 2013/0040604 A1 | 2/2013 | Sprigg et al. |
| 2013/0091452 A1 | 4/2013 | Sorden et al. |
| 2013/0124410 A1 | 5/2013 | Kay et al. |

OTHER PUBLICATIONS

Hinze, "Event-Based Applications and Enabling Technologies". DEBS'09, Jul. 6-9. 15 Pages.

* cited by examiner

LOCATION-BASED ACCOUNT ACTIVITY ALERTS

FIELD OF THE INVENTION

This patent application relates to a method for issuing alerts of activities that may occur involving accounts.

BACKGROUND

To allow customers of financial institutions to better manage their respective financial accounts, many financial institutions offer notification services whereby alert messages are issued notifying their customers of activities (e.g. debit or credit card transactions, low deposit account balance) that have occurred on their respective financial accounts. To allow the customer to have timely receipt of the alerts, typically the customer configures the service to issue the alerts to the customer's mobile electronic device (e.g. mobile phone, smart phone, personal digital assistant). When the customer enters a zone in which audible alerts are prohibited (e.g. cinemas) or undesirable, (e.g. hospitals), the customer must either manually deactivate the sound/vibrate functions of the mobile phone or manually reconfigure the notification service to terminate the issuance of alerts. When the customer leaves the zone, the customer must then either manually reactivate the sound/vibrate functions of the mobile phone or manually reconfigure the notification service to continue the issuance of alerts. Since the customer might forget to deactivate/reactivate the sound/vibrate functions or to reconfigure the notification service, these approaches to controlling alert notifications are inconvenient.

Nadler (US 2009/0131080) describes automatically providing content and services to mobile devices based on the identity of the user and the location of the mobile device. The owner of a presence zone may provide to a presence zone service provider various parameters such as the coordinates of the presence zone, and the services that may be provided to a mobile device while in the presence zone. Mobile device users and presence zone owners may also provide a presence server with preference information. The presence zone service provider determines the location of the mobile device and associates the location with one or more presence zones. A presence detector tailors the content and services to be provided to the mobile device based on the presence zone, the properties of the zone (e.g. a restaurant), the identity of the mobile device user, and the specified preferences.

As examples, Nadler discloses that the presence zone may define a retail location in which the mobile device user may receive promotional messages for services that are available in the retail location. The presence zone may define a mandatory silence zone in which the mobile device is prohibited from originating phone calls and directs incoming calls to voice-mail or an alternate destination. The presence zone may define a quiet zone in which the mobile device is prevented from ringing unless over-ridden by the mobile device user. Incoming calls to the mobile device may be directed to the alternate destination while the device is in the quiet zone, and then directed to the mobile device when the device leaves the quiet zone.

SUMMARY

This patent application discloses an alert notification server, a mobile electronic device and associated method that controls the issuance of alerts to customers based on the current position and/or speed of the customer's mobile electronic device.

In accordance with a first aspect of the disclosure, there is provided a method of controlling issuance of alerts by an alert notification server. The alert notification server maintains at least one event definition defining particulars for the suspension of notifications of events at an account. The method involves the alert notification server receiving notification of an occurrence of an event at the account, and determining a current position and/or speed of a mobile electronic device associated with the account.

While the current position or speed correlates with one of the event definitions, the alert notification server saves in an events history the occurrence of the event and an occurrence of at least one additional event occurring at the account subsequent to the event, and suspends notification of the saved occurrences to the mobile electronic device. When the current position and speed no longer correlate with any of the event definitions, the alert notification server transmits to the mobile electronic device a notification of the occurrences saved in the events history and clears the events history.

In accordance with a second aspect of the disclosure, there is provided an alert notification server that includes a network interface, a database of at least one event definition, an events history, and an alert processing system. Each event definition defines particulars for the suspension of notifications of events at an account. The alert processing system is coupled to the network interface, the database and the events history and is configured to receive notification of occurrence of an event at an account, and determine a current position and/or speed of a mobile electronic device associated with the account.

The alert processing system is configured to, while the current position or speed correlates with one of the event definitions, save in an events history the occurrence of the event and an occurrence of at least one additional event occurring at the account subsequent to the event, and suspend notification of the saved occurrences to the mobile electronic device. The alert processing system is further configured to, when the current position and speed no longer correlate with any of the event definitions, transmit to the mobile electronic device a notification of the occurrences saved in the events history and clear the events history.

In one implementation, the alert processing system suspends notification of the saved occurrences by transmitting to the mobile electronic device a confirmation message requesting acceptance of the suspension, and upon receipt of the acceptance withholding transmission of the notification of the saved occurrences until the current position and speed no longer correlate with any of the event definitions. The alert processing system may further suspend notification of the saved occurrences by transmitting to the mobile electronic device the notification of the saved occurrences and clearing the events history after non-receipt of the acceptance for a duration of a time-out period.

Since the alert processing system saves the occurrence of the events and suspends notification of the saved occurrences while the current position or speed of the mobile electronic device correlates with one of the event definitions, and transmits a notification of the saved occurrences when the current position and speed no longer correlate with any of the event definitions, the user of the mobile electronic device ultimately receives notification of the occurrence of all events, even if the events occurred while the position or speed of the mobile electronic device correlated with one of the event definitions.

BRIEF DESCRIPTION OF THE DRAWINGS

An exemplary alert notification server, and method of controlling issuance of alerts by the alert notification server will now be described, with reference to the accompanying drawings, in which.

DETAILED DESCRIPTION

Electronic Alert Notification Network

Figure 1:
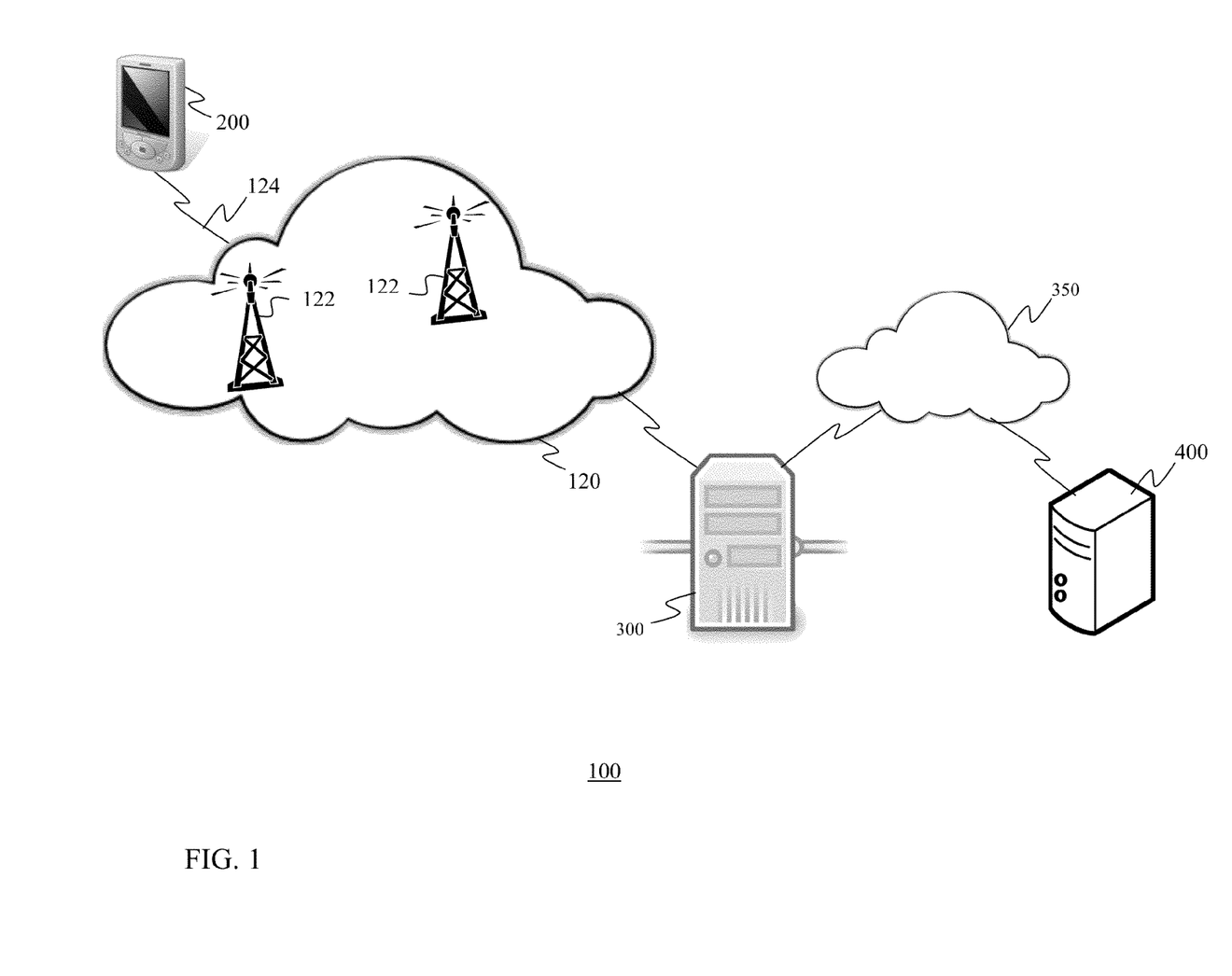
FIG. 1 is a schematic view of an electronic alert notification network, depicting a mobile electronic device and an exemplary alert notification server.

FIG. 1 is a schematic view of an electronic alert notification network, denoted generally as 100. As shown, the electronic alert notification network 100 comprises a mobile electronic device 200, an alert notification server 300, and an accounts server 400. Although the electronic alert notification network 100 is shown comprising only a single mobile electronic device 200, the electronic alert notification network 100 typically comprises a plurality of the mobile electronic devices 200. Similarly, although the electronic alert notification network 100 is shown comprising only a single alert notification server 300, the electronic alert notification network 100 may include a plurality of the alert notification servers 300. Moreover, although FIG. 1 depicts both an alert notification server 300 and an accounts server 400, the functionality of the accounts server 400 may be incorporated into the alert notification server 300.

The mobile electronic devices 200 are typically implemented as wireless communications devices configured to operate within a wireless network. Accordingly, the electronic alert notification network 100 may also include a mobile communications network 120. The mobile communications network 120 may be configured as a WiFi network, a cellular network, or a combination thereof. As shown, the mobile communications network 120 comprises a plurality of wireless base station subsystems 122. The mobile electronic devices 200 communicate with the base station subsystems 122 via wireless links 124, and the base station subsystems 122 communicate with the alert notification server(s) 300 via a wired, wireless or optical link. Accordingly, the base station subsystems 122 act as a bridge between the wireless links 124 and the alert notification server(s) 300.

Mobile Electronic Device

Figure 2:
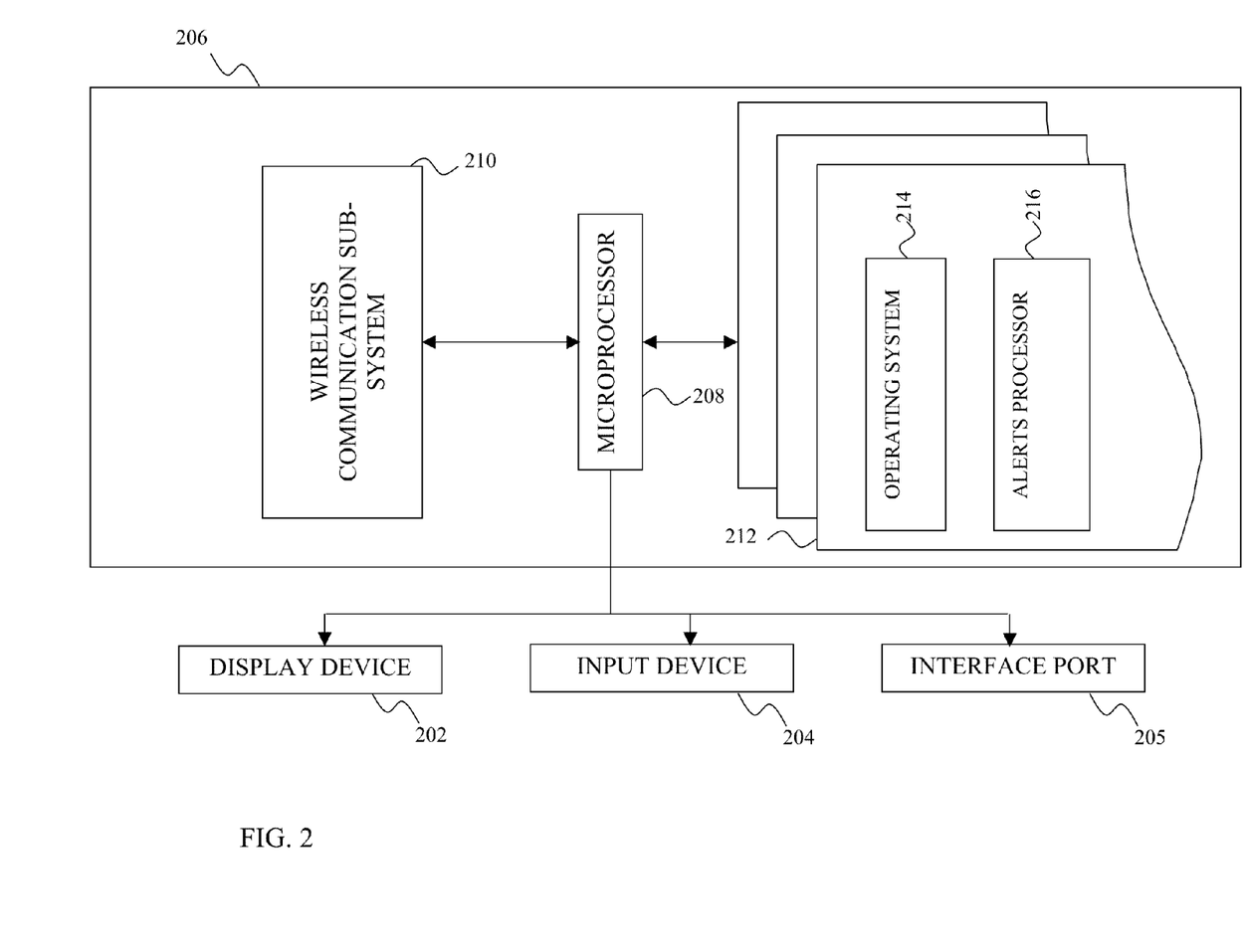
FIG. 2 is a schematic view of an exemplary mobile electronic device.

A sample mobile electronic device 200, implemented as a wireless communications device, is depicted in FIG. 2. As shown, the mobile electronic device 200 includes a display 202, user input device 204 and a data processing system 206. The user input device 204 may be provided as a keyboard, biometric input device (e.g. microphone) and/or a touch-sensitive layer provided on the display 202. The data processing system 206 comprises a microprocessor 208, a wireless communication sub-system 210 and a memory 212. The communication sub-system 210 allows the mobile electronic device 200 to communicate with the mobile communications network 120. As discussed, the mobile communications network 120 may be configured as a WiFi network, a cellular network, or a combination thereof. Accordingly, the communication sub-system 210 allows the mobile electronic device 200 to transmit and receive wireless communications signals over WiFi networks and/or cellular networks.

The mobile electronic device 200 may also include an interface port 205 that is in communication with the data processing system 206 and is configured to interface the mobile electronic device 200 with an external docking station. The docking station may physically mount the mobile electronic device 200 to a vehicle, such as an automobile or motorcycle, and may electrically interface with the mobile electronic device 200 via a physical electrical connector or wireless communications. As will be discussed in greater detail below, preferably the docking station notifies the data processing system 206 that the mobile electronic device 200 is interfaced with the docking station, to thereby cause the data processing system 206 to disable alert notifications while the mobile electronic device 200 is interfaced with the docking station.

The memory 212 includes non-transient computer processing instructions stored thereon which, when accessed from the memory 212 and executed by the microprocessor 208, implement an operating system 214, and an alerts processor 216. The operating system 214 is configured to display output on the display 202, to receive user input from the input device 204, and to send and receive communication signals over the wireless link 124 of the mobile communications network 120. The operation of the alerts processor 216. However, it is sufficient at this point to note that the alerts processor 216 is configured to provide the alert notification server 300 with an indication of the current position (e.g. absolute location, relative location) and/or speed of the mobile electronic device 200.

To determine the absolute location of the mobile electronic device 200, the alerts processor 216 may be configured to obtain from the WiFi network and/or cellular network (of the mobile communications network 120) location information identifying the current location of the mobile electronic device 200, and to transmit the location information to the alert notification server 300. Alternately, or additionally, the mobile electronic device 200 may be configured with a Global Positioning System (GPS) receiver, and the alerts processor 216 may be configured to obtain from the GPS receiver location information identifying the current location of the mobile electronic device 200 and to transmit the location information to the alert notification server 300. The alerts processor 216 may be configured to determine the speed of the mobile electronic device 200 from the location information. To determine relative location, the alerts processor 216 may be configured to determine whether the mobile electronic device 200 is interfaced with an external docking station that physically mounts the mobile electronic device 200 to a vehicle.

The alerts processor 216 is also configured to receive from the alert notification server 300 a notification of one or more events that occurred at an account associated with the user (account holder) of the mobile electronic device 200, and to generate at the electronic transaction device 200 an audio and/or visual output identifying the event(s). As used herein, an event includes, but is not limited to, a deposit of monetary funds to a financial account, a withdrawal of funds from a financial account, a transfer of funds to/from a financial account, a bill payment transaction, an account balance query, a debit card transaction, a credit card transaction, and a low deposit account balance. Further, the events are not limited to those associated with financial accounts, but may include events associated with other types of accounts, including but not limited to loyalty point accounts and service provider accounts (e.g. an event identifying issuance of a invoice, a package delivery or a work order).

Alert Notification Server

Figure 3:
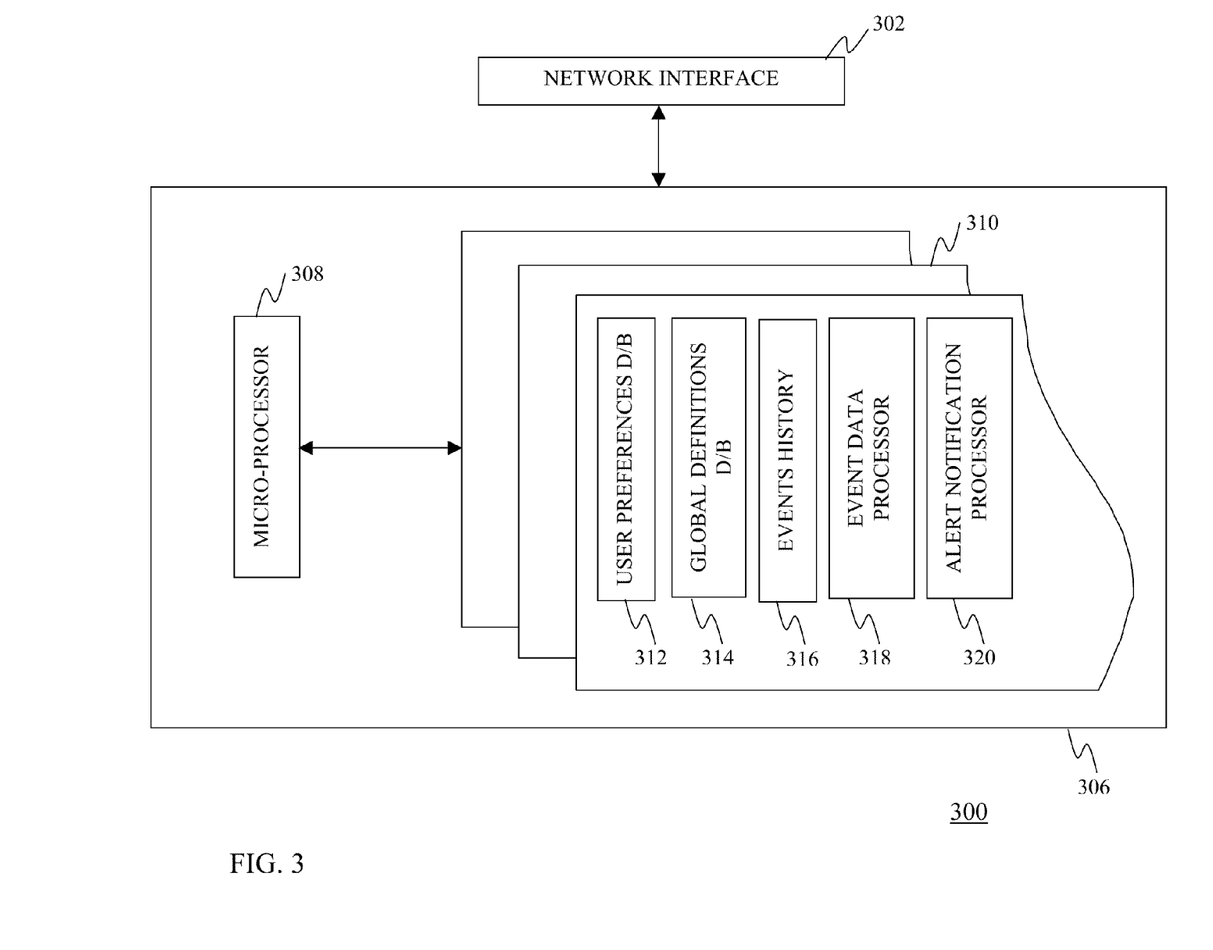
FIG. 3 is a schematic view of an exemplary alert notification server.

The alert notification server 300 comprises a computer server, and is configured to communicate with the mobile electronic device(s) 200 via the mobile communications network 120, and to communicate with the accounts server 400. As shown in FIG. 3, the alert notification server 300 includes a network interface 302, and a computer processing system 306 that is coupled to the network interface 302. The network interface 302 interfaces the alert notification server 300 with the base station subsystems 122 of the mobile communications network 120 to thereby allow the alert notification server 300 to communicate with the mobile electronic device(s) 200. The network interface 302 also allows the alert notification server 300 to communicate with the accounts server 400.

The computer processing system 306 may include one or more microprocessors 308 and a computer-readable medium 310. The computer-readable medium 310 may be provided as electronic computer memory (e.g. flash memory) or optical or magnetic memory (e.g. compact disc, hard disk). The computer-readable medium 310 maintains a user preferences database 312, a global definitions database 314 and an events history 316.

The user preferences database 312 includes a plurality of clusters each associated with a respective account maintained by the accounts server 400. Each cluster typically comprises a plurality of database records that include a unique user identifier, and one or more user event definitions defining the events for which the account holder would like to receive event notifications at the mobile electronic device 200. Each event definition specifies the account number of the account for which the account holder would like to receive event notifications, and one or more event activity requirements which are required to be satisfied at the associated account prior to issuance of an event notification. As examples, an event activity requirement might be satisfied upon a deposit of funds in any amount to the account, a withdrawal of funds above a threshold amount from the account, a transfer of funds in any amount to/from the account, any bill payment transaction, an account balance query, a debit card transaction in any amount, a credit card transaction above a threshold amount, and a deposit account balance being less than a threshold amount.

One or more of the user event definitions may also specify particulars of a static (i.e. fixed location) notification-free zone for which the account holder would like the associated event notification to suspended ("user-defined static notification-free zone"). The user-defined static notification-free zones are typically defined using geographical parameters (e.g. longitude/latitude, metes/bounds).

One or more of the user event definitions may also specify particulars of a dynamic (i.e. non-fixed location) notification-free zone for which the account holder would like the associated event notification to be suspended ("user-defined dynamic notification-free zone"). The user-defined dynamic notification-free zones are typically defined using non-geographical parameters, such as relative locations and/or thresholds. For example, a user event definition may specify that an event notification should suspended while the mobile electronic device 200 is mounted in a vehicle, regardless of the location or speed of the vehicle. In this variation, the event notification may be suspended when the mobile electronic device 200 detects that it is interfaced with an external docking station that physically mounts the mobile electronic device 200 to the vehicle. Alternately, a user event definition may specify that an event notification should be suspended if the mobile electronic device 200 is moving at a speed greater than a threshold speed, independently of a connection to any external docking station.

Alternately, one or more of the user event definitions may specify particulars of a dynamic or static notification-permitted zone for which the account holder would like to receive event notifications (respectively "user-defined dynamic notification-permitted zones" and "user-defined static notification-permitted zones"), such that all static and dynamic notification-permitted zones not defined by the user event definitions are implicitly user-defined notification-free zones.

The global definitions database 314 comprises a plurality of database records of global event definitions, each specifying particulars of a dynamic notification-free zone or a static notification-free zone for which event notifications must be suspended ("mandatory global event definition") or for which event suspension is recommended ("recommended global event definition"). Unlike the user event definitions, the global event definitions are not associated with any particular account holder or account, but instead apply independently of the account holder and the associated account. Static notification-free zones defined by mandatory global event definitions are locations, such as cinemas, courtrooms and libraries, in which occupants would normally be required to turn-off their mobile electronic devices 200 or to disable sound notifications on their mobile electronic devices 200. Static notification-free zones defined by recommended global event definition are locations, such as classrooms, fuel dispensing stations, hospitals and in vehicles, in which device operators should turn off their mobile electronic devices 200 or disable sound notifications on their mobile electronic devices 200.

The events history 316 temporarily saves event notification data identifying the events that occurred at each account maintained by the accounts server 400, and for which the user preferences database 312 includes a user event definition that is associated with the account or for which the global definitions database 314 includes a global event definition. Preferably, the events history 316 does not save event notification data identifying the events that occurred at accounts for which the user preferences database 312 does not include a user event definition and the events for which the global definitions database 314 does not include a global event definition.

The computer-readable medium 310 also maintains non-transient computer processing instructions stored thereon which, when executed by the microprocessor(s) 308, define an operating system (not shown) that controls the overall operation of the alert notification server 300. The computer processing instructions also implement an event data processor 318 and an alert notification processor 320.

The event data processor 318 is configured to receive notification data notifying the alert notification server 300 of events occurring at an account that is maintained by the accounts server 400, and to save the event occurrences in the events history 316. For each event occurrence saved in the events history 316, the alert notification processor 320 is configured to determine the current position (e.g. absolute location, relative location) and/or speed of the mobile electronic device 200 that is associated with the account specified in the event occurrence.

The alert notification processor 320 is configured to suspend issuing notifications to the mobile electronic device 200 while the current position or speed of the mobile electronic device 200 correlates with the particulars of an event definition for which the associated event notification is to be suspended (i.e. a user-defined notification-free zone defined for the account, a notification-free zone defined by a mandatory event definition or a recommended event definition). While the current position and/or speed of the mobile electronic device 200 correlates with the particulars of one of the event definitions for which the associated event notification is to be suspended, the event data processor 318 saves in the events history 316 the occurrence of at least one additional event that occurred at that same account after the alert notification processor 320 suspended issuing notifications to the mobile electronic device 200. The alert notification processor 320 is also configured to transmit to the mobile electronic device 200 a notification of the event occurrences that were saved in the events history 316 for that account, and to clear the events history 316, when the current position and speed of the mobile electronic device 200 no longer correlate with the particulars of any event definition for which the associated event notification is to be suspended.

Although the event data processor 318 and the alert notification processor 320 are typically implemented as computer processing instructions, all or a portion of the functionality of the event data processor 318 and/or the alert notification processor 320 may be implemented instead in electronics hardware.

Accounts Server

The accounts server 400 comprises a computer server, and is typically is implemented as a financial institution server that is configured to maintain financial accounts and to facilitate process transactions involving the financial accounts. However, as discussed, the accounts server 400 may be configured to maintain accounts, other than financial accounts, such as, but not limited to, loyalty point accounts and service provider accounts.

The accounts server 400 may be configured to communicate with the alert notification server 300 via a secure network 350. Preferably, the secure network 350 is implemented as a virtual private network. However, the electronic alert notification network 100 need not include the secure network 350, and the alert notification server 300 and the accounts server 400 need not be provided as distinct servers. Instead, the functionality of the accounts server 400 may be incorporated into the alert notification server 300.

Method of Controlling Issuance of Alerts

As discussed, the electronic alert notification network 100 implements a method of controlling issuance of alerts. As will be explained, in this embodiment the alert notification server 300 maintains at least one event definition specifying the particulars (e.g. geographical parameters, non-geographical parameters) for the suspension of notifications of events at an account. The method of controlling issuance of alerts begins with the alert notification server 300 receiving notification of the occurrence of an event at an account. The alert notification server 300 saves in the events history 316 the occurrence of the event, and determines the current position (e.g. absolute location, relative location) and/or speed of a mobile electronic device 200 associated with the account.

While the current position or speed correlates with one of the event definitions for which the associated event notification is to be suspended, the alert notification server 300 saves in the events history 316 the occurrence of at least one additional event occurring at the account subsequent to the event, and suspends notification of the saved event occurrences to the mobile electronic device 200. When the current position and speed no longer correlate with any of the event definitions for which the event notification should be suspended, the alert notification server 300 transmits to the mobile electronic device 200 a notification of the event occurrences that are saved in the events history 316, and clears the events history 316 for the account.

Figure 4:
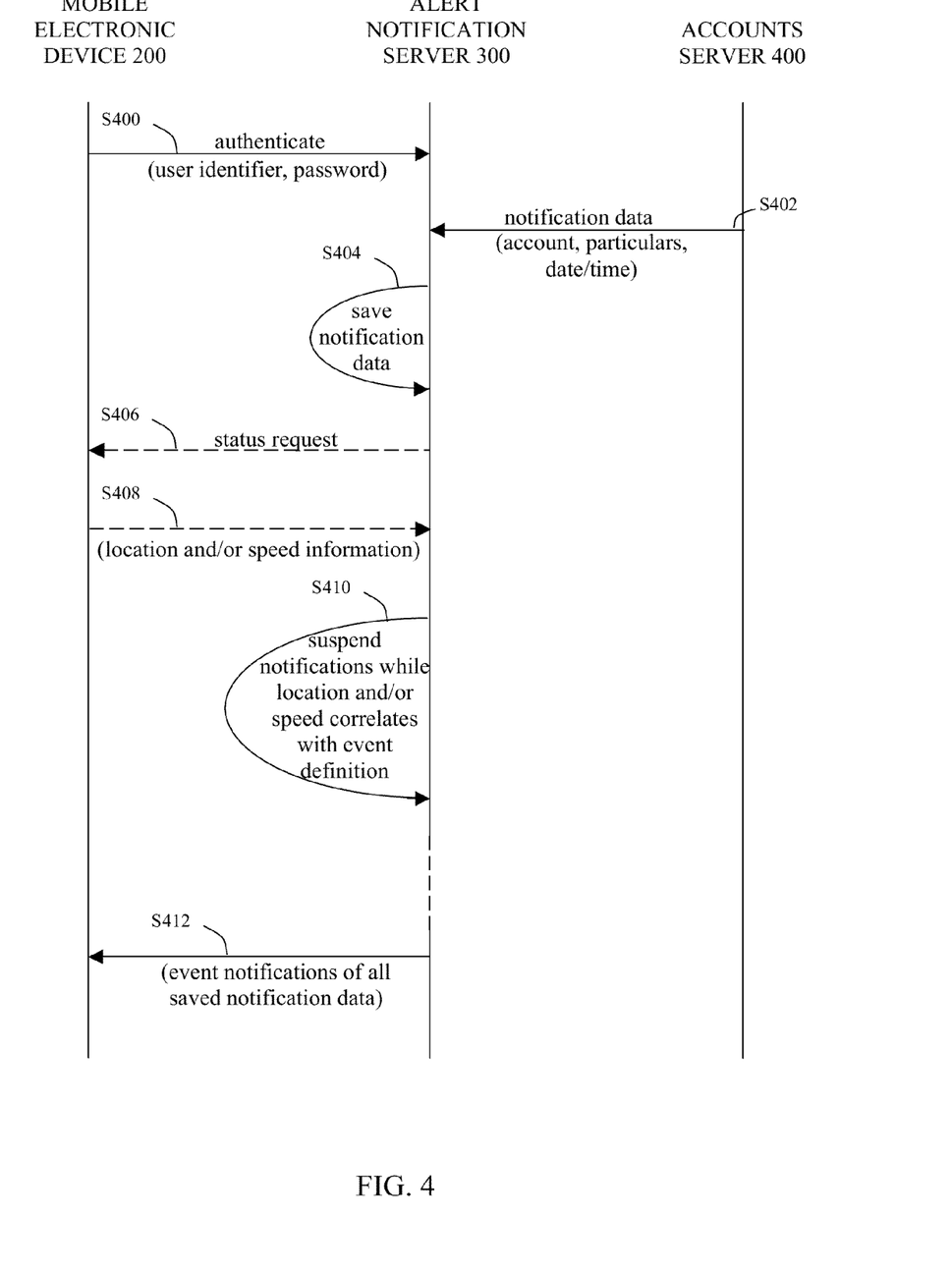
FIG. 4 is a message flow diagram depicting the method of controlling issuance of alerts.

The method of controlling issuance of alerts will now be discussed in detail with reference to FIG. 4. At the outset of the method, the user of the mobile electronic device 200 may use the mobile electronic device 200 to authenticate to the alert notification server 300. Typically, the user (account holder) authenticates by providing the alert notification server 300 with the authentication credentials (e.g. user identifier and password) that the device user normally uses to initiate electronic banking with the accounts server 400.

After successfully authenticating to the alert notification server 300, the alert notification server 300 establishes an encrypted communications channel with the user's mobile device 200, and the device user may use its mobile electronic device 200 to invoke an alert registration process implemented by the alert notification server 300. In response, the alert notification server 300 prompts the device user to provide one or more user event definitions that define the events for which the device user would like to receive event notifications at the mobile electronic device 200.

In response, the device user may use the mobile electronic device 200 to specify the account(s) for which the device user would like to receive event notifications, and one or more associated event activity requirements which are required to be satisfied at the associated account prior to issuance of an event notification. Preferably, the device user also specifies the particulars (e.g. geographical parameters, non-geographical parameters) associated with the event (occurring at the account) for which the user would like the associated event notification to be suspended and/or particulars (e.g. geographical parameters, non-geographical parameters) associated with an event (occurring at the account) for which the user would like to receive event notifications (i.e. one or more user event definitions). The device user may provide the alert notification server 300 with the particulars via the input device 204. Alternately, the alert notification server 300 may maintain a database of parameters (e.g. device 200 is (is not) interfaced with a docking station, threshold speeds, geographical parameters identifying locations of interest (e.g. hospitals, cinemas)) from which the device user can specify the user event definition(s).

The alert notification server 300 saves the unique user identifier, and the user event definition(s) in the user preferences database 312. The registration process terminates after the alert notification server 300 confirms to the user's mobile electronic device 200 that it has saved the user identifier and user event definition(s) in the user preferences database 312.

To enable the mobile electronic device 200 to receive alerts from the alert notification server 300, at step S400 the user of the mobile electronic device 200 may use the alerts processor 216 on the mobile electronic device 200 to authenticate to the alert notification server 300. Typically, the device user authenticates by providing the alert notification server 300 with the authentication credentials (e.g. user identifier and password) that the device user normally uses to initiate electronic banking with the accounts server 400.

After the device user authenticates to the alert notification server 300, the payment processing server 300 may establish with the alerts processor 216 an encrypted communications channel over which the alerts processor 216 may directly receive event notifications from the payment processing server 300. Alternately, instead of authenticating to the alert notification server 300, the device user may use the mobile electronic device 200 to register the alerts processor 216 and the unique user identifier with a push notification service to thereby allow the alerts processor 216 to indirectly receive event notifications from the alert notification server 300 via the push notification service.

Thereafter, in response to the occurrence of an event (e.g. funds withdrawal, bill payment, debit/credit card transaction) at one of the accounts maintained by the accounts server 400, at step S402 the accounts server 400 transmits to the alert notification server 300 a notification datum notifying the alert notification server 300 of the occurrence of the event. The notification datum typically includes the account number of the account, particulars of the activity that occurred at the account (e.g. transaction amount, account balance), and the date/time of the occurrence of the activity.

In response, the event data processor 318 of the alert notification server 300 queries the user preferences database 312 with the account number (specified in the notification datum) to locate an event definition associated with the account. If (i) the user preferences database 312 does not include any user event definition associated with the account identified in the notification datum and the activity particulars of the notification datum do not satisfy the activity requirement(s) of any global event definition, or (ii) the user preferences database 312 includes a user event definition associated with the account but the activity particulars of the notification datum do not satisfy the activity requirement(s) of the located user event definition, the event data processor 318 disposes of the notification datum.

Otherwise, if the activity particulars of the notification datum satisfy the activity requirements of the located user event definition or a global event definition, at step S404 the event data processor 318 saves the notification datum in the events history 316. Typically, the event data processor 318 receives the notification data from the account server 400 in real-time, or substantially real-time, as the events occur at the respective accounts, and the event data processor 318 saves each notification datum in the events history 316 in real-time, or substantially real-time, as it is received from the accounts server 400.

For each notification datum that is added to the events history 316, at step S406 preferably the alert notification processor 320 determines the current position (e.g. absolute location, relative location) and/or speed of the mobile electronic device 200 that is associated with the account specified in the notification datum that was added to the events history 316. To ensure that the alert notification processor 320 processes each new notification datum that is added to the events history 316, the event data processor 318 may notify the alert notification processor 320 of the new entries that are added to the events history 316. Alternately, the alert notification processor 320 may periodically query the events history 316 for new entries added to the events history 316.

To determine the position and speed of the mobile electronic device 200 that is associated with the notification datum, the alert notification processor 320 queries the user preferences database 312 with the account number (included in the added notification datum) to locate the user identifier that is associated with the account number. As discussed, the mobile electronic device 200 may have authenticated to the alert notification server 300 with a user identifier, at step S400. Accordingly, the alert notification processor 320 may use the user identifier to determine the encrypted communications channel that the alert notification processor 320 established with the mobile electronic device 200 at step S400, and may send a status request message to the alerts processor 216, via the encrypted channel at step S406, requesting position and/or speed information from the alerts processor 216 of the mobile electronic device 200.

Alternately, if the alerts processor 216 registered with a push notification service at step S400, the alert notification processor 320 may generate a status request message that includes the user identifier, and send the status request message to the push notification service for delivery by the push notification service to the alerts processor 216 of the mobile electronic device 200, at step S406.

At step S408, the alerts processor 216 determines the current position (e.g. absolute location, relative location) and/or speed of the mobile electronic device 200, and transmits the position and speed information to the alert notification server 300. As discussed, the alerts processor 216 may obtain absolute location information from a WiFi network and/or cellular network of the mobile communications network 120 and/or from a GPS receiver installed in the mobile electronic device 200. The alerts processor 216 may determine its speed from the absolute location information. The alerts processor 216 may determine its relative position based, for example, on whether the mobile electronic device 200 is interfaced with a docking station. Preferably, the alerts processor 216 continues to periodically transmit the position and speed information to the alert notification server 300 until the alerts processor 216 receives a status termination message from the alert notification processor 320. Alternately, the alerts processor 216 may periodically transmit the current position and speed information and the user identifier to the alert notification server 300 without receiving a status request message from the alert notification server 300.

At step S410, the alert notification processor 320 queries the notification datum (added to the events history 316 at step S404) with the position and speed information to determine whether the current position or speed of the mobile electronic device 200 correlates with one of the user event definitions defined for the account holder in the user preferences database 312. The alert notification processor 320 suspends issuing event notifications to the mobile electronic device 200 while the current position or speed of the mobile electronic device 200 correlates with one of the user event definitions defined for the account holder in the user preferences database 312.

If the current position and speed do not correlate with one of the user event definitions defined for the account holder in the user preferences database 312, at step S410 the alert notification processor 320 queries the global definitions database 314 with the received position and speed information to determine whether the current position or speed of the mobile electronic device 200 correlate with one of the mandatory event definitions defined in the global definitions database 314. The alert notification processor 320 suspends issuing event notifications to the mobile electronic device 200 while the position or speed of the mobile electronic device 200 correlates with one of the mandatory event definitions defined in the global definitions database 314.

As will be appreciated, depending on the capabilities of the mobile electronic device 200, the alerts processor 216 may be incapable of transmitting speed information to the alert notification server 300. If the alerts processor 216 transmitted location information to the alert notification server 300 at step S408, without any speed information, but one or more of the user or global event definitions was defined using a speed threshold, the alert notification server 300 may use the received location information, together with the time instant of receipt of the location information, to compute the average speed of the mobile electronic device 200, and thereby allow the alert notification processor 320 to determine whether the current speed of the mobile electronic device 200 correlates with any of the user or global event definitions.

In one variation, if the current position or speed of the mobile electronic device 200 correlates with one of the user event definitions defined for the account holder in the user preferences database 312 or correlates with one of the recommended event definitions defined in the global definitions database 314, the alert notification processor 320 transmits to the mobile electronic device 200 an event notification that includes the notification datum that was added to the events history 316 at step S404, but excludes the notification data that is associated with the account and was added to the events history 316 subsequent to step S404. Preferably, the event notification also includes a confirmation request message requesting that the device user confirm that the alert notification server 300 should suspend event notifications of all subsequent events at the account while the current position or speed of the mobile electronic device 200 correlates with one of the user or recommended event definitions. Depending on the response received from the mobile electronic device 200, the alert notification processor 320 either continues to transmit to the mobile electronic device 200 event notifications of all subsequent events at the account, or suspends event notifications of all subsequent events at the account while the current position or speed of the mobile electronic device 200 correlates with one of the user or recommended event definitions.

In another variation, the confirmation request message requests that the device user confirm that the alert notification server 300 should continue to transmit event notifications of all subsequent events at the account while the current position or speed of the mobile electronic device 200 correlates with one of the user or recommended event definitions. In this variation, if the alert notification processor 320 does not receive confirmation from the mobile electronic device 200 after expiry of a time-out period, the alert notification processor 320 suspends event notifications of all subsequent events at the account while the current position or speed of the mobile electronic device 200 correlates with one of the user or recommended event definitions.

In a further variation, instead of transmitting a confirmation request message to the mobile electronic device 200 if the current position or speed of the mobile electronic device 200 correlates with one of the user-defined or recommended notification-free zones, the alert notification processor 320 may use the responses received from the mobile electronic device 200 in response to previous confirmation request messages to predict whether to transmit or suspend event notifications.

For example, on a number of prior occasions the device user might have not confirmed that the alert notification server 300 should suspend event notifications of all subsequent events at the account while the current position or speed of the mobile electronic device 200 correlates with a particular user or recommended event definition. In this case, if the number of prior occasions is greater than a threshold, the alert notification processor 320 might automatically continue to transmit to the mobile electronic device 200 event notifications of all subsequent events at the account while the current position or speed of the mobile electronic device 200 correlates with that particular user or recommended event definition.

Conversely, on a number of prior occasions the device user might have confirmed that the alert notification server 300 should suspend event notifications of all subsequent events at the account while the current position or speed of the mobile electronic device 200 correlates with a particular user or a recommended event definition. In this case, if the number of prior occasions is greater than a threshold, the alert notification processor 320 might automatically suspend event notifications of all subsequent events at the account while the current position or speed of the mobile electronic device 200 correlates with that particular user or recommended event definition.

Since the event data processor 318 saves each notification datum in the events history 316 as it is received from the accounts server 400, the event data processor 318 continues to save in the events history 316 the notification datum for each event that occurs while the alert notification processor 320 is suspending event notifications to the mobile electronic device 200. Therefore, while the current position or speed of the mobile electronic device 200 correlates with one of the event definitions, the event data processor 318 saves in the events history 316 a notification datum of at least one additional event that occurred at that same account subsequent to the time instant that the notification datum was added to the events history 316 at step S404.

When the current position and speed of the mobile electronic device 200 no longer correlate, or if the current position and speed do not correlate, with any of the user event definitions defined for the account holder in the user preferences database 312 and with any of the global event definitions defined in the global definitions database 314 (or the device user has requested that event notifications not be suspended while the mobile electronic device 200 is in the current notification-free zone), at step S412 the alert notification processor 320 may transmit to the mobile electronic device 200 (that is associated with the account identified in the notification datum) event notifications of all the notification data that was saved in the events history 316 for that account. The alert notification processor 320 may also transmit to the mobile electronic device 200 a status termination message requesting that the alerts processor 216 discontinue sending current position and speed information.

After the alert notification processor 320 transmits to the mobile electronic device 200 event notifications of all the notification data that was saved for that account, the alert notification processor 320 clears the events history 216 of all the notification data that was saved for that account.

Upon receipt of the notification data, at step S414 the alerts processor 216 of the mobile electronic device 200 generates an audio and/or visual output signal notifying the device user of the event that occurred when the mobile electronic device 200 first moved into one of the notification-free zones, and all the events that occurred subsequent thereto until the mobile electronic device 200 exited from the notification-free zone.

In one variation, instead of the alert notification processor 320 suspending transmission of event notifications to the mobile electronic device 200 while the current position or speed of the mobile electronic device 200 correlates with any of the user event definitions defined for the account holder or with any of the global event definitions defined in the global definitions database 314, the alert notification processor 320 continues to transmit the event notifications to the mobile electronic device 200 regardless of the current position and speed of the mobile electronic device 200. However, in contrast to the event notifications described above, the event notifications include particulars of the associated notification-free zone. Therefore, the alerts processor 216 suspends generating any audio or visual output signal notifying the device user of the events until the current position and speed of the mobile electronic device 200 no longer correlate with any of the notification-free zones.

The invention claimed is:
1. A method of controlling issuance of alerts by an alert notification server, the alert notification server maintaining at least one event definition defining particulars of suspension of notifications of events at an account, the method comprising:

the alert notification server receiving notification of occurrence of an event at the account, saving in an events history the occurrence of the event receiving device information from a mobile electronic device associated with the account, and determining at least one of a position and speed of the mobile electronic device from the received device information;

upon the position or speed correlating with one of the event definitions, the alert notification server entering a notification suspension mode comprising the alert notification server saving in the events history an occurrence of at least one additional event occurring at the account subsequent to the event, and suspending notification of the saved occurrences to the mobile electronic device; and the alert notification server exiting the notification suspension mode and entering a notification resumption mode upon the position and speed no longer correlating with any of the event definitions, the notification resumption mode comprising the alert notification server transmitting to the mobile electronic device a notification of the occurrences saved in the events history and clearing the events history, wherein the suspending notification of the saved occurrences comprises the alert notification server transmitting to the mobile electronic device a confirmation message requesting acceptance of the suspending, and upon receipt of the acceptance withholding transmission of the notification of the saved occurrences until the current position and speed no longer correlate with any of the event definitions, and wherein the suspending notification of the saved occurrences further comprises the alert notification server transmitting to the mobile electronic device the notification of the saved occurrences and clearing the events history after non-receipt of the acceptance for a duration of a time-out period.

2. The method according to claim 1, wherein the confirmation message identifies the occurrence of the event and excludes notification of the at least one additional event.

3. An alert notification server comprising:
a network interface;
a database of event definitions each defining particulars of suspension of notifications of events at an account;
an events history; and
an alert processing system coupled to the network interface, the database and the events history and configured to:
receive notification of occurrence of an event at an account, save in the events history the occurrence of the event, receive device information from a mobile electronic device associated with the account, determine at least one of a position and speed of the mobile electronic device from the received device information;
upon the position or speed correlating with one of the event definitions, enter a notification suspension mode comprising saving in the events history an occurrence of at least one additional event occurring at the account subsequent to the event, and suspending notification of the saved occurrences to the mobile electronic device; and
exit the notification suspension mode and enter a notification resumption mode upon the position and speed no longer correlating with any of the event definitions, the notification resumption mode comprising transmitting to the mobile electronic device a notification of the occurrences saved in the events history and clearing the events history,
wherein the alert processing system is configured suspend notification of the saved occurrences by transmitting to the mobile electronic device a confirmation message requesting acceptance of the suspending, and upon receipt of the acceptance withholding transmission of the notification of the saved occurrences until the position and speed no longer correlate with the any of the event definitions, and
wherein the alert processing system is further configured to suspend notification of the saved occurrences by transmitting to the mobile electronic device the notification of the saved occurrences and clearing the events history after non-receipt of the acceptance for a duration of a time-out period.

4. The alert notification server according to claim 3, wherein the confirmation message identifies the occurrence of the event and excludes notification of the at least one additional event.

5. A non-transitory computer-readable medium storing at least one event definition defining particulars of suspension of notifications of events at an account and carrying computer processing instructions stored thereon which, when executed by a computer, cause the computer to execute a method comprising:
receiving notification of occurrence of an event at the account saving in an events history the occurrence of the event, receiving device information from a mobile electronic device associated with the account, and determining at least one of a position and speed of the mobile electronic device from the received device information;
upon the position or speed correlating with one of the event definitions, entering a notification suspension mode comprising the alert notification server saving in the events history an occurrence of at least one additional event occurring at the account subsequent to the event, and suspending notification of the saved occurrences to the mobile electronic device; and
exiting the notification suspension mode and entering a notification resumption mode upon the position and speed no longer correlating with any of the event definitions, the notification resumption mode comprising transmitting to the mobile electronic device a notification of the occurrences saved in the events history and clearing the events history,
wherein the suspending notification of the saved occurrences comprises transmitting to the mobile electronic device a confirmation message requesting acceptance of the suspending, and upon receipt of the acceptance withholding transmission of the notification of the saved occurrences until the current position and speed no longer correlate with any of the event definitions, and
wherein the suspending notification of the saved occurrences further comprises transmitting to the mobile electronic device the notification of the saved occurrences and clearing the events history after non-receipt of the acceptance for a duration of a time-out period.

6. The non-transitory computer-readable medium according to claim 5, wherein the confirmation message identifies the occurrence of the event and excludes notification of the at least one additional event.

* * * * *